Dec. 7, 1926.

S. KUCHTA 1,610,016

FOLDING BICYCLE

Filed Feb. 25, 1925  2 Sheets-Sheet 1

INVENTOR.
Steven Kuchta
BY
ATTORNEYS.

Dec. 7, 1926.  S. KUCHTA  1,610,016
FOLDING BICYCLE
Filed Feb. 25, 1925  2 Sheets-Sheet 2
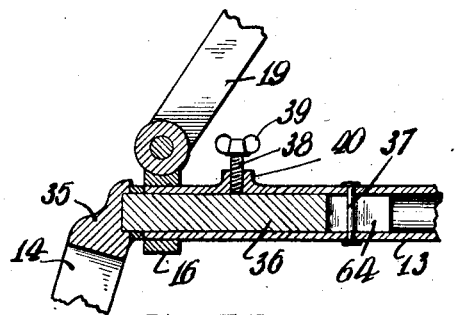
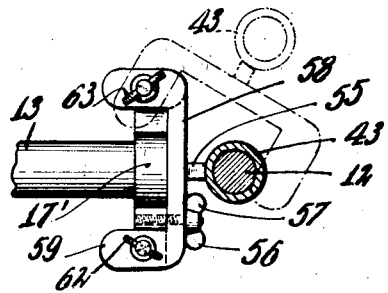
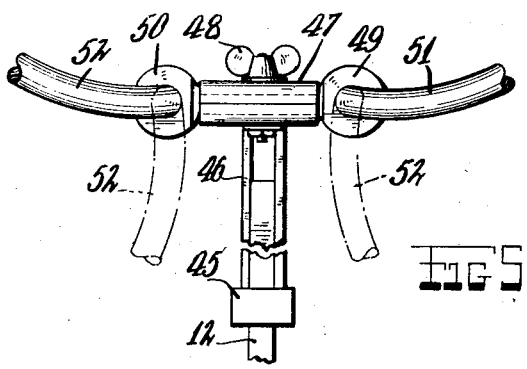
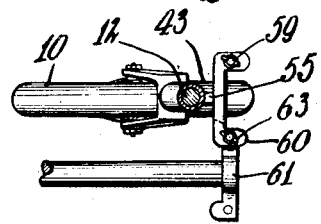
INVENTOR.
Steven Kuchta
BY
ATTORNEYS.

Patented Dec. 7, 1926.

1,610,016

UNITED STATES PATENT OFFICE.

STEVEN KUCHTA, OF NEW YORK, N. Y.

FOLDING BICYCLE.

Application filed February 25, 1925. Serial No. 11,413.

The object of the present invention is an improvement in bicycles, particularly in bicycles with folding frames, and it is one of the main objects to provide such a vehicle with means allowing a ready and convenient folding of the frame for permitting a handy transportation and storage.

Another object of the invention is the provision of a bicycle of this type having novel and improved means for removably attaching the rear wheel to the frame allowing a secure connection during the use of the bicycle and a ready detachment from the frame.

A further object of the invention is the provision of a bicycle equipped with novel and improved means for detachably connecting the handle bars to the frame, and for locking the same in their relative adjusted positions.

A still further object of the invention is the provision of a bicycle having a foldable frame of simple and inexpensive, yet efficient construction.

These and other objects and advantages of my invention will become more fully known as the description thereof proceeds, and will then be specifically pointed out in the appended claims.

In the accompanying drawings, forming a material part of this disclosure:

Fig. 3 is a section along line 3—3 of Figure 2.

Fig. 4 is a fragmentary sectional view of the frontal connecting member, the section being taken on line 4—4 of Fig. 1.

Fig. 5 is a fragmentary front end view of the upper frame part and the handles.

Fig. 6 is a fragmentary detail top plan view of a frame connecting member.

Figure 1:
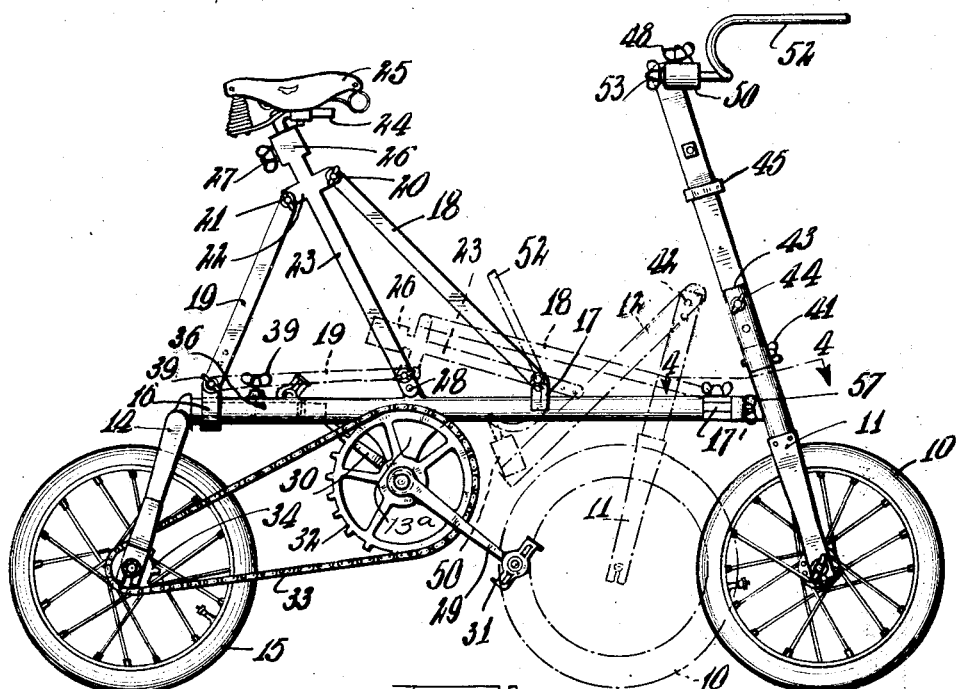
Fig. 1 is a side elevation of a bicycle constructed according to the present invention with the folded frame indicated in broken lines.
Figure 2:
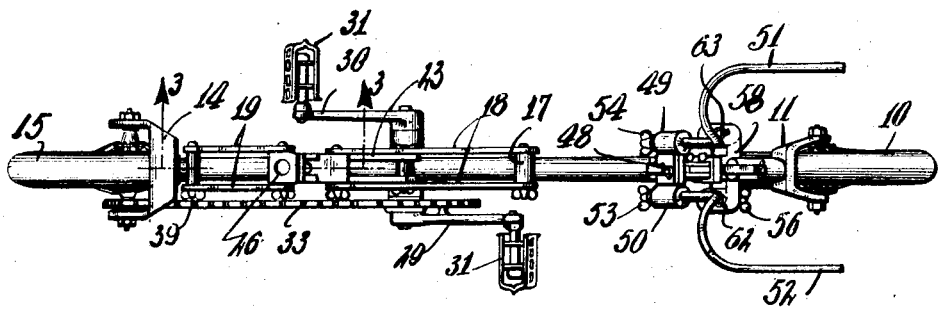
Fig. 2 is a top plan view thereof.

The bicycle comprises the usual front or steering wheel 10 having its axle journalled in the well known manner in suitable bearings at the lower ends of the steering fork 11 to the upper ends of which the steering post 12 is secured in the usual manner. A horizontal connecting bar 13 connects the sleeve for the steering post with the upper end of the fork 14 for the rear wheel 15. The bar 13 carries band 16, and fork 17 to which are pivotally connected the lower ends of bars 18 and 19 having their upper ends connected by means of wing nut bolts 20 and 21 to a cross-bar or head 22 near the upper end of the post 23 for the saddle support 24 carrying the saddle 25 of the well known construction and adjustably held in position in the upper socket 26 of the post 23 by means of the customary wing nut bolt 27. The lower end of the post 23 is pivotally attached to a wart of the bar 13 as shown at 28. The frame of the bicycle has a depending standard 13ª which carries the shaft for the cranks 29 and 30 for the foot pedals 31 and the sprocket wheel 32 over which the customary sprocket chain 33 is guided which is also guided over the smaller sprocket wheel 34 on the axle for the rear wheel 15.

The fork 14 for the rear wheel has an upper head part 35 to which is attached one end of a horizontal member or block 36 entering the bar 13 and held therein by means of a cross-pin 37, passing through an opening in block 36.

A bolt 38 carrying a wing nut 39 enters a socket 40 of bar 13 and engages the block 36 therein.

The steering post 12 is held within its customary sleeve by a wing nut bolt 41 and is made in two parts, an upper and a lower one, pivotally connected as at 42, which are held in alignment within a sleeve 43 by means of a wing nut bolt 44. The upper end of the post 12 carries a collar 45 at the end of a fork 46 which has attached thereto at its upper end a block 47 by means of the wing nut screw 48 equipped with lateral sockets 49 and 50 into which the inner ends of the handle bars 51 and 52 are entered, and held in their operating position by means of adjusting screws having wing nuts 53 and 54 at their outer ends, allowing a swing of the handle bars into the position illustrated by the broken lines in Figures 1 and 5.

The sleeve 43 for the steering post 12 is connected by means of a link 55 to a member 56 connected to band 17' by means of a wing nut screw 57, and composed of two parts, an upper one, 58 having two lateral cheeks 59 and 60, and a lower one, 61 having two similar cheeks. Wing nut bolts 62 and 63 passing through both members allow a swinging of the lower member around one of the same into a position as indicated in broken lines in Figure 4 when the frame is to be folded.

The operation of the device will clear from the above description without further detailed explanation, after the loosening of the wing nuts 41, 44, 53, 54, 62 and 63 the front part of the frame may be folded into the position indicated in broken lines in Figure 1 after the bolt 37 has been suitably displaced in the opening 64 of the block 36, whereafter the block 36 may be removed from bar 13 by the loosening of wing nut bolt 39 so that the rear wheel may also be folded against the remainder of the frame.

It will be clear that changes may be made in the general construction and in the arrangement of the minor details of my device without departure from the scope and spirit of the invention as specified in the appended claims.

Having thus described my invention, what I claim as new, and desire to secure by Letters Patent is:

1. A folding bicycle frame, comprising means for allowing a collapsing of the front bar, a means for permitting a collapsing of the saddle bar, a means for turning the handle bars, and a means for allowing detaching the rear wheel from the frame and a means for allowing a swinging of the foldable parts into and out of their operating positions and for locking these parts in their respectively assumed position.

2. A folding bicycle frame, comprising a hollow horizontal connecting bar, a block removably held in the rear end of said bar, means for holding both parts in engagement, a head on the rear wheel fork attached to said block, a saddle carrier, means for allowing a collapsing of the same against said connecting bar, and a means for allowing a folding of the front bar besides said connecting bar, and means for locking the parts in their extending operating positions.

3. A folding bicycle frame, comprising a hollow horizontal connecting bar, a means within said bar allowing a displacement of front and rear frame parts relatively to each other, a saddle carrying frame connected to said connecting bar and adapted to be folded against the same, a foldable front bar allowing a folding of front bar, wheel and handles besides said connecting bar, and means for securing the parts in their adjusted positions.

4. In a folding bicycle frame, a connecting horizontal bar, a block removably held in the rear end of said bar, a fork for the rear wheel of the bicycle having a head attached to said block, a transverse pin in said bar allowing a displacement of the front part of the bicycle frame against the rear part thereof, means for allowing a collapsing of the front parts besides said bar, and means for locking the parts in their relative adjusted positions.

In testimony whereof I have affixed my signature.

STEVEN KUCHTA.